United States Patent
Ahn et al.

(10) Patent No.: US 10,396,647 B2
(45) Date of Patent: Aug. 27, 2019

(54) CONVERTER CONTROLLING DEVICE FOR HYBRID VEHICLE AND CONVERTER CONTROLLING METHOD FOR HYBRID VEHICLE

(71) Applicant: MANDO CORPORATION, Pyeongtaek-si, Gyeonggi-do (KR)

(72) Inventors: Hee Rak Ahn, Seongnam-si (KR); In Gyu Jang, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 118 days.

(21) Appl. No.: 15/725,117

(22) Filed: Oct. 4, 2017

(65) Prior Publication Data

US 2018/0102702 A1    Apr. 12, 2018

(30) Foreign Application Priority Data

Oct. 10, 2016 (KR) .................. 10-2016-0130759
Sep. 28, 2017 (KR) .................. 10-2017-0126084

(51) Int. Cl.
*H02M 1/00* (2006.01)
*H02P 29/50* (2016.01)
(Continued)

(52) U.S. Cl.
CPC .............. *H02M 1/00* (2013.01); *B60L 53/22* (2019.02); *H02P 25/08* (2013.01); *H02P 27/06* (2013.01); *H02P 29/50* (2016.02); *B60L 2210/20* (2013.01); *B60L 2210/40* (2013.01); *B60W 20/00* (2013.01); *B60W 2510/08* (2013.01);
(Continued)

(58) Field of Classification Search
CPC .......... H02M 1/00; H02P 29/00; H02P 29/50; H02P 27/00; H02P 27/04; H02P 27/06; B60L 2210/00; B60L 9/00; B60L 58/00; B60L 58/10; B60L 58/12; B60W 20/00
See application file for complete search history.

(56) References Cited

U.S. PATENT DOCUMENTS 6,522,960 B2 * 2/2003 Nada ................. B60K 6/445
701/22
7,969,121 B2 * 6/2011 Smith ................. H02M 3/1584
320/167
(Continued)

FOREIGN PATENT DOCUMENTS

KR    10-1241221 B1    3/2013

*Primary Examiner* — Yonel Beaulieu
(74) *Attorney, Agent, or Firm* — Morgan, Lewis & Bockius LLP (57) ABSTRACT

A converter controlling device for a hybrid vehicle and a converter controlling method for a hybrid vehicle. A monitor monitors a state of charge (SoC) of a low voltage battery, a SoC of a high voltage battery, and a load value of an electronic load. A comparator compares a level of the SoC of the low voltage battery, a level of the SoC of the high voltage battery, and the load value of the electronic load with a first charging threshold value, a second charging threshold value, and a load threshold value. A determiner determines whether to adjust an output control value of a converter. A control value adjuster decreases the output control value of the converter to be lower than a level during normal control or increases the output control value of the converter to be higher than the level during the normal control.

10 Claims, 7 Drawing Sheets

(51) Int. Cl.
*H02P 25/08* (2016.01)
*H02P 27/06* (2006.01)
*B60L 53/22* (2019.01)
*B60W 20/00* (2016.01)

(52) U.S. Cl.
CPC ... *B60W 2510/244* (2013.01); *B60W 2710/30* (2013.01); *H02M 2001/0032* (2013.01); *Y02T 10/7005* (2013.01); *Y02T 10/7072* (2013.01); *Y02T 10/725* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 9,136,783 B2* | 9/2015 | Mitsutani | B60L 15/00 |
| 9,166,515 B2* | 10/2015 | Kaita | B60L 15/2009 |
| 9,397,370 B2* | 7/2016 | Nebrigic | H01M 10/44 |
| 9,711,979 B2* | 7/2017 | Takemura | H01M 10/425 |
| 9,873,339 B2* | 1/2018 | Mitsutani | B60L 58/20 |
| 2001/0041952 A1* | 11/2001 | Nada | B60K 6/445 |
| | | | 701/22 |
| 2005/0048335 A1* | 3/2005 | Fields, III | H01M 8/04559 |
| | | | 429/432 |
| 2013/0264975 A1* | 10/2013 | Kaita | B60L 15/2009 |
| | | | 318/139 |
| 2018/0043789 A1* | 2/2018 | Goetz | H02J 7/0024 |

* cited by examiner

CONVERTER CONTROLLING DEVICE FOR HYBRID VEHICLE AND CONVERTER CONTROLLING METHOD FOR HYBRID VEHICLE

CROSS REFERENCE TO RELATED APPLICATION

The present application claims priority from Korean Patent Application Numbers 10-2016-0130759 filed on Oct. 10, 2016 and 10-2017-0126084 filed on Sep. 28, 2017, the entire contents of which are incorporated herein for all purposes by this reference.

BACKGROUND

Field

The present disclosure relates to a hybrid vehicle. More particularly, the present disclosure relates to a converter controlling device for a hybrid vehicle and a converter controlling method for a hybrid vehicle, able to improve energy efficiency by efficiently controlling a converter supplying power to a low voltage battery and an electronic load.

Description

Generally, generation control of an alternator means that a generation quantity of the alternator is controlled based on battery state information and vehicle state information. Since the alternator may consume a large amount of fuel during generation in the generation control, unlike a conventional generation method for starting an engine and then maintaining a 12V battery in a fully charged state, a generation control method for increasing a generation quantity in a low fuel-consuming section has recently been applied to a wide range of vehicle types.

Meanwhile, a 48V belt-driven starter generator (BSG) system assists in torque through motoring during acceleration, operates as a generator during deceleration, or uses accumulated battery energy during stopping by replacing an alternator with a high power motor, thereby improving fuel efficiency.

In the 48V BSG system, a converter replaces an alternator supplying power to a 12V electronic load and charging a battery. Here, the converter converts an output of an inverter or an output of a 48V battery to supply the converted output to the 12V electronic load.

However, such a conventional hybrid system has a problem in that continuous energy loss occurs while generated energy is charged in a 48V battery and the 48V battery is discharged to supply charged energy through a converter.

BRIEF SUMMARY

Various aspects of the present disclosure provide a converter controlling device for a hybrid vehicle and a converter controlling method for a hybrid vehicle, able to improve energy efficiency by shortening a path of a power supply to a load during generation and reducing use of a high voltage battery during non-generation.

According to an aspect, a converter controlling device for a hybrid vehicle may include: a monitor monitoring a state of charge (SoC) of a low voltage battery, a SoC of a high voltage battery, and a load value of an electronic load; a comparator comparing a level of the SoC of the low voltage battery, a level of the SoC of the high voltage battery, and the load value of the electronic load with a first charging threshold value, a second charging threshold value, and a load threshold value, respectively; a determiner determining whether to adjust an output control value of a converter as comparison results of the comparator; and a control value adjuster decreasing the output control value of the converter to be lower than a level during normal control such that a power supply amount from the low voltage battery to the electronic load is increased, or increasing the output control value of the converter to be higher than the level during the normal control such that a power supply amount through the converter is increased, as a determination result of the determiner.

As the comparison results, when the level of the SoC of the low voltage battery is higher than the first charging threshold value and the load value of the electronic load is lower than the load threshold value, the determiner may determine to turn the converter off, and the control value adjuster may turn the converter off.

As the comparison results, when the level of the SoC of the low voltage battery is higher than the first charging threshold value and the load value of the electronic load is higher than the load threshold value, the determiner may determine to decrease the output control value of the converter, and the control value adjuster may decrease the output control value of the converter to be lower than the level during the normal control.

As the comparison results, when the level of the SoC of the low voltage battery is lower than the first charging threshold value, the level of the SoC of the high voltage battery is higher than the second charging threshold value, and the load value of the electronic load is higher than the load threshold value, the determiner may determine to increase the output control value of the converter, and the control value adjuster may increase the output control value of the converter to be higher than the level during normal control.

The determiner may determine whether a motor-generator operates in an engine generation mode or regenerative braking mode, and when the motor-generator operates in the engine generation mode or the regenerative braking mode, and concurrently, the level of the SoC of the high voltage battery is higher than the second charging threshold value as the comparison results, the determiner may determine to enable the inverter and increase the output control value of the converter, and the control value adjuster may increase the output control value of the converter to be higher than the level during the normal control.

According to another aspect, a converter controlling method for a hybrid vehicle may include: monitoring a state of charge (SoC) of a low voltage battery, a SoC of a high voltage battery, a load value of an electronic load; comparing a level of the SoC of the low voltage battery, a level of the SoC of the high voltage battery, and the load value of the electronic load with a first charging threshold value, a second charging threshold value, and a load threshold value, respectively; determining whether to adjust an output control value of a converter as comparison results; and adjusting the output control value by decreasing the output control value of the converter to be lower than a level during normal control such that a power supply amount from the low voltage battery to the electronic load is increased, or increasing the output control value of the converter to be higher than the level during the normal control such that a power supply amount through the converter is increased, as a determination result.

When, in the comparison, the level of the SoC of the low voltage battery is higher than the first charging threshold value and the load value of the electronic load is lower than the load threshold value, it may be determined to turn the converter off in the determination, and the converter is turned off in the adjustment.

When, in the comparison, the level of the SoC of the low voltage battery is higher than the first charging threshold value and the load value of the electronic load is higher than the load threshold value, it may be determined to decrease the output control value of the converter in the determination, and in the adjustment, the output control value of the converter may be decreased to be lower than the level during the normal control.

When, in the comparison, the level of the SoC of the low voltage battery is lower than the first charging threshold value, the level of the charge of state of the high voltage battery is higher than the second charging threshold value, and the load value of the electronic load is higher than the load threshold value, it may be determined to increase the output control value of the converter in the determination, and in the adjustment, the output control value of the converter may be increased to be higher than the level during the normal control.

The converter controlling method may further include: determining whether a motor-generator operates in an engine generation mode or a regenerative braking mode; and when the motor-generator operates the engine generation mode or the regenerative braking mode, and concurrently, in the comparison, the level of the charge of state of the high voltage battery is higher than the second charging threshold value, enabling an inverter, wherein, in the adjustment, the output control value of the converter is increased to be higher than the level during the normal control.

According to the converter controlling device for a hybrid vehicle and the converter controlling method for a hybrid vehicle according to the present disclosure, since power is directly supplied to an electronic load or a low voltage battery through a converter rather than a high voltage battery during generation, a path of a power supply to the load through the converter can be shortened to reduce energy loss, thereby improving energy efficiency.

In addition, according to the present disclosure, since use of a high voltage battery is reduced by making the best of a low voltage battery, a timing of fuel consumption for engine generation can be delayed to decrease a fuel consumption amount, thereby improving fuel economy of a vehicle.

BRIEF DESCRIPTION OF THE DRAWINGS

The above and other objects, features and advantages of the present disclosure will be more clearly understood from the following detailed description when taken in conjunction with the accompanying drawings, in which.

DETAILED DESCRIPTION

Embodiments of the present disclosure will be described in detail with reference to the accompanying drawings to allow those skilled in the art to easily achieve the present disclosure. However, the present disclosure may be achieved in various different ways and is not limited to the embodiments described herein. In the accompanying drawings, portions unrelated to the description will be omitted in order to obviously describe the present disclosure, and similar reference numerals will be used to describe similar portions throughout the present specification.

Figure 1:
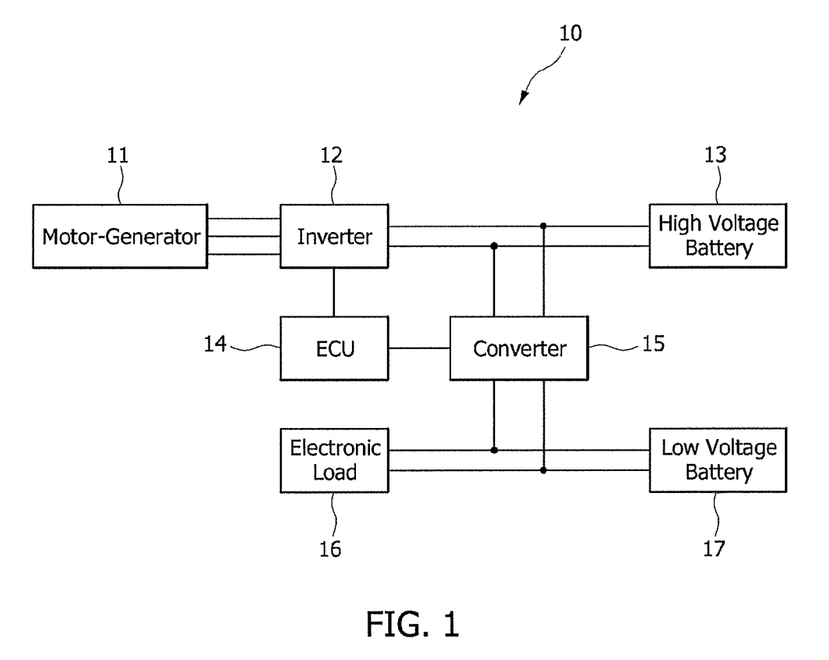
FIG. 1 is a block diagram illustrating a hybrid vehicle according to an embodiment of the present disclosure.

Hereinafter, a converter controlling device for a vehicle, according to an embodiment of the present disclosure, will be described in more detail with reference to the accompanying drawings. FIG. 1 is a block diagram illustrating a hybrid vehicle 10 according to an embodiment of the present disclosure.

Referring to FIG. 1, the hybrid vehicle 10 according to the embodiment of the present disclosure includes a motor-generator 11, an inverter 12, a high voltage battery 13, an electronic control unit (ECU) 14, a converter 15, an electronic load 16, and a low voltage battery 17.

The hybrid vehicle 10 may be a belt-driven starter generator (BSG) system in which an engine and the motor-generator 11 are interlocked with each other via a belt, and may be a mild hybrid system which uses a 48V battery as the high voltage battery 13.

The motor-generator 11 may function as a starter motor starting an engine and a generator generating an AC voltage. Specifically, when the motor-generator 11 functions as the starter motor, the motor-generator 11 may perform an auxiliary role in engine power by receiving a driving voltage through the inverter 12. When the motor-generator 11 functions as the generator, the motor-generator 11 may charge the high voltage battery 13 by supplying electrical energy generated during braking of a vehicle to the high voltage battery 13.

The inverter 12 may be a bidirectional inverter converting an alternating current (AC) voltage into a direct current (DC) voltage, or vice versa. The inverter 12 may convert electrical energy supplied by the high voltage battery 13 to supply the converted electrical energy to the motor-generator 11 or may convert electrical energy generated by the motor-generator 11 to charge the high voltage battery 13 by supplying the converted electrical energy to the high voltage battery 13.

Here, the charging of high voltage battery 13 is performed in an engine generation mode in which charging is performed by an engine consuming fuel, as well as through regenerative generation, in which charging is performed during coasting and braking, in which a driver does not accelerate an engine.

The high voltage battery 13 may include a plurality of super capacitors. When a vehicle is decelerated, the high voltage battery 13 may be charged by receiving electrical energy generated during regenerative braking from the motor-generator 11, and when a vehicle is accelerated, the high voltage battery 13 may supply charged electrical energy to the motor-generator 11 to assist in engine torque. In an example, the high voltage battery 13 may be a 48V battery.

The ECU 14 may control respective elements and may include a converter controlling device 100 to be described later.

In order to improve energy efficiency of the hybrid vehicle 10, the ECU 14 may adjust an output control value of the converter 15 according to a state of charge (SoC) of the high voltage battery 13, a SoC of the low voltage battery 17 and a load value LD of the electronic load 16. Here, the output control value may be a factor value for increasing or decreasing an output of the converter 15 and may be a voltage magnitude and a pulse width of a pulse width modulation (PWM) pulse of the converter 15, but is not limited thereto. The factor value is not particularly limited as long as it can adjust the output of the converter 15.

The converter 15 is a DC-DC converter converting a direct current level. The converter 15 may convert an output of the inverter 12 when generation is performed, or a voltage of the high voltage battery 13 when generation is not performed. The converter 15 may supply the converted output or the converted voltage to the electronic load 16 or to the low voltage battery 17 to charge the low voltage battery 17.

The electronic load 16 may include various loads used during driving of the hybrid vehicle 10. For example, the electronic load 16 may include a component such as a lamp consuming power, or an electric control means and a driving means controlled by the electric control means. The electronic load 16 receives power from the low voltage battery 17 or the high voltage battery 13 through the converter 15.

The low voltage battery 17 may be charged by receiving electrical energy converted by the converter 15 and may supply charged power to the electronic load 16 of the hybrid vehicle 10. In an example, the low voltage battery 17 may be a 12V battery.

Figure 2:
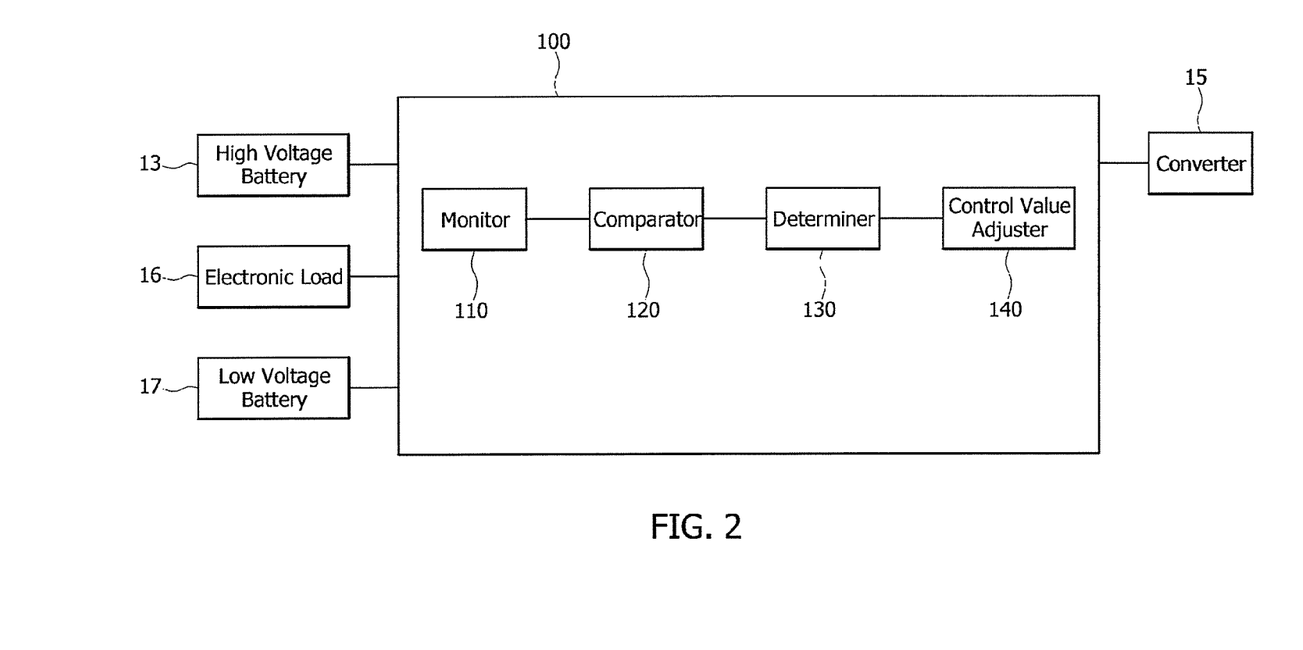
FIG. 2 is a block diagram illustrating a converter controlling device for a hybrid vehicle, according to an embodiment of the present disclosure.

FIG. 2 is a block diagram illustrating a converter controlling device 100 of the hybrid vehicle 100, according to an embodiment of the present disclosure.

The converter controlling device 100 is implemented by the ECU 14 of FIG. 1. The converter controlling device 100 includes a monitor 10, a comparator 120, a determiner 130, and a control value adjuster 140.

The monitor 110 may be connected to the high voltage battery 13, the low voltage battery 17, and the electronic load 16 and may monitor the SoC of the high voltage battery 13 and the high voltage battery 17 and the load value LD of the electronic load 16.

Here, the monitor 110 may monitor the SoC of the high voltage battery 13 and the SoC of the low voltage battery 17 using intelligent battery sensors provided in anodes of the high voltage battery 13 and the low voltage battery 17.

In addition, the monitor 110 may monitor the load value LD of the electronic load 16, i.e. a magnitude of power required to drive the electronic load 16 using a current sensed by the IBS or a current sensed by a separate sensor according to a power supply of the converter 15 and the low voltage battery 17.

In order to determine whether to adjust the output control value of the converter 15, the comparator 120 may compare a level of the SoC of the high voltage battery 13, a level of the SoC of the low voltage battery 17, and the load value LD of the electronic load 16 with reference values.

More specifically, in order to determine whether to charge the low voltage battery 17, the comparator 120 may compare the level of the SoC of the low voltage battery 170 with a first charging threshold value Th1. Here, the first charging threshold value Th1 indicates a level at which the low voltage battery 17 requires charging.

In addition, in order to determine whether the low voltage battery 17 can supply power to the electronic load 16 for a certain period of time, the comparator 120 may compare the load value LD of the electronic load 16 with a load threshold value Th2. Here, the load threshold value Th2 means a load value LD in which the low voltage battery 17 can maintain a current SoC thereof at the charging threshold value Th1 or more for a certain period of time.

In addition, in order to determine whether the charging of the high voltage battery 13 can be minimized, the comparator 120 may compare the level of the SoC of the high voltage battery 13 with a second charging threshold value Th3. Here, the second charging threshold value Th2 indicates a level at which the high voltage battery 13 requires charging.

The determiner 130 may determine whether to adjust the output control value of the converter 15, as the comparison results of the comparator 120. Here, in order to save energy charged in the high voltage battery 13, the determiner 130 may determine whether to adjust the output control value of the converter 15.

In addition, in order to shorten a path of a power supply through the converter 15, the determiner 130 may determine whether to adjust the output control value of the converter 15. Here, the determiner 130 may determine whether the motor-generator 11 operates in an engine generation mode or a regenerative braking mode. When the motor-generator 11 operates in the engine generation mode or the regenerative braking mode, and concurrently, the charging of the high voltage battery 13 is not required as the comparison results of the comparator 120, the determiner 130 may determine to enable the inverter 12 and increase the output control value of the converter 15.

Based on the determination result of the determiner 130, the control value adjuster 140 may decrease the output control value of the converter 15 to be lower than a level during normal control such that a power supply amount from the low voltage battery 17 to the electronic load 16 is increased, or may increase the output control value of the converter 15 to be higher than a level during normal control, such that a power supply amount through the converter 15 is increased.

For example, when the level of the SoC of the low voltage battery 17 is higher than the first charging threshold value Th1 and the load value LD of the electronic load 16 is lower than the load threshold value Th2, that is, when the charging of the low voltage battery 17 is not required and sufficient power is supplied by the low voltage battery 17 to the electronic load 16, the control value adjuster 140 may perform controlling to turn the converter 15 off, such that the low voltage battery 17 supplies power to the electronic load 16 alone.

As described above, since the control value adjuster 140 turns the converter 15 off, that is, cuts off power supply to the electronic load 16 from the high voltage battery 13 by turning the converter 15 off, energy charged in the high voltage battery 13 can be saved. Accordingly, it is possible to delay a timing of engine generation for maintaining the SoC of the high voltage battery 13, thereby delaying a timing of fuel consumption required for engine generation.

Furthermore, when regenerative generation is performed by regenerative braking before the engine generation mode starts, according to driving conditions of the hybrid vehicle 10, the high voltage battery 13 can be charged by the regenerative generation, thereby further delaying the start of the engine generation mode for maintaining the SoC of the high voltage battery 13.

In addition, when the level of the SoC of the low voltage battery 17 is higher than the first charging threshold value Th1 and the load value LD of the electronic load 16 is higher than the load threshold value Th2, that is, when the charging of the low voltage battery 17 is not required, but due to a required power of the electronic load 16 being high, the low voltage battery 17 alone cannot supply sufficient power to the electronic load 16 for a certain period of time, the control value adjuster 140 may control the high voltage battery 13 as well as the low voltage battery 17 to supply power through the converter 15. Here, in order to make full use of power of the low voltage battery 17, the control value adjuster 140 may decrease the output control value of the converter 15 to be lower than a level during normal control.

Here, the converter 15 may supply a current amount required for the electronic load 16 to maintain a specific voltage, by using power of the high voltage battery 13. In this case, the control value adjuster 140 performs control to maintain the output control value of the converter 15 to a certain level.

In particular, when generation is not performed by the motor-generator 11, the case in which the output control value of the converter 15 is maintained at a certain level means that power of the high voltage battery 13 is consumed. Thus, according to embodiments of the present disclosure, in order to decrease consumption of power of the high voltage battery 13 through the converter 15 as described above, the output control value of the converter 15 can be decreased to be lower than a certain level during normal control.

As described above, since the control value adjuster 140 decreases the output control value of the converter 15 to be lower than a certain level during normal control, it is possible to meet necessary power of the electronic load 16 and minimize consumption of energy charged in the high voltage battery 13. Accordingly, it is possible to delay a timing of the engine generation mode for maintaining the SoC of the high voltage battery 13, thereby delaying a timing of fuel consumption required for the engine generation mode.

In addition, when the level of the SoC of the low voltage battery 17 is lower than the first charging threshold value Th1, the level of the SoC of the high voltage battery 13 is higher than the second charging threshold value Th3, and the load value LD of the electronic load 16 is higher than the load threshold value Th2, that is, when the charging of the low voltage battery 17 is required, but the high voltage battery 13 can supply sufficient power to the electronic load 16, the control value adjuster 140 may increase the output control value of the converter 15 to be lower than a certain level during normal control, thereby increasing an amount of power supplied through the converter 15.

As described above, since the control value adjuster 140 increases the output control value of the converter 15 to be higher than a certain level during normal control, it is possible to decrease a power supply to the electronic load 16 from the low voltage battery 17, thereby quickly charging the low voltage battery 17.

In addition, when the motor-generator 11 operates in an engine generation mode or a regenerative braking mode, and concurrently, the level of the SoC of the high voltage battery 13 is higher than the second charging threshold value Th3 as the determination result of the determiner 130, that is, when the charging of the high voltage battery 130 is not required, the control value adjuster 140 may increase the output control value of the converter 15 to be higher than a certain level during normal control, thereby increasing an amount of power supplied through the converter 15.

As described above, since the control value adjuster 140 increases the output control value of the converter 15 to be higher than a certain level during normal control during the engine generation mode or the regenerative generation mode, as described above, after power is charged in the high voltage battery 13, the power may not be supplied to the electronic load 16 or the low voltage battery 17 through the converter 15 and an output of the inverter 12 may be directly supplied to the electronic load 16 or the low voltage battery 17 through the converter 15. Accordingly, it is possible to shorten a path of a power supply through the converter 15, thereby improving energy efficiency.

Due to the configuration described above, the converter controlling device 100 can shorten a path of a power supply to a load through a converter to improve energy efficiency. The converter controlling device 100 can delay a timing of fuel consumption for engine generation to decrease a fuel consumption amount, thereby improving fuel economy of a vehicle.

Figure 3:
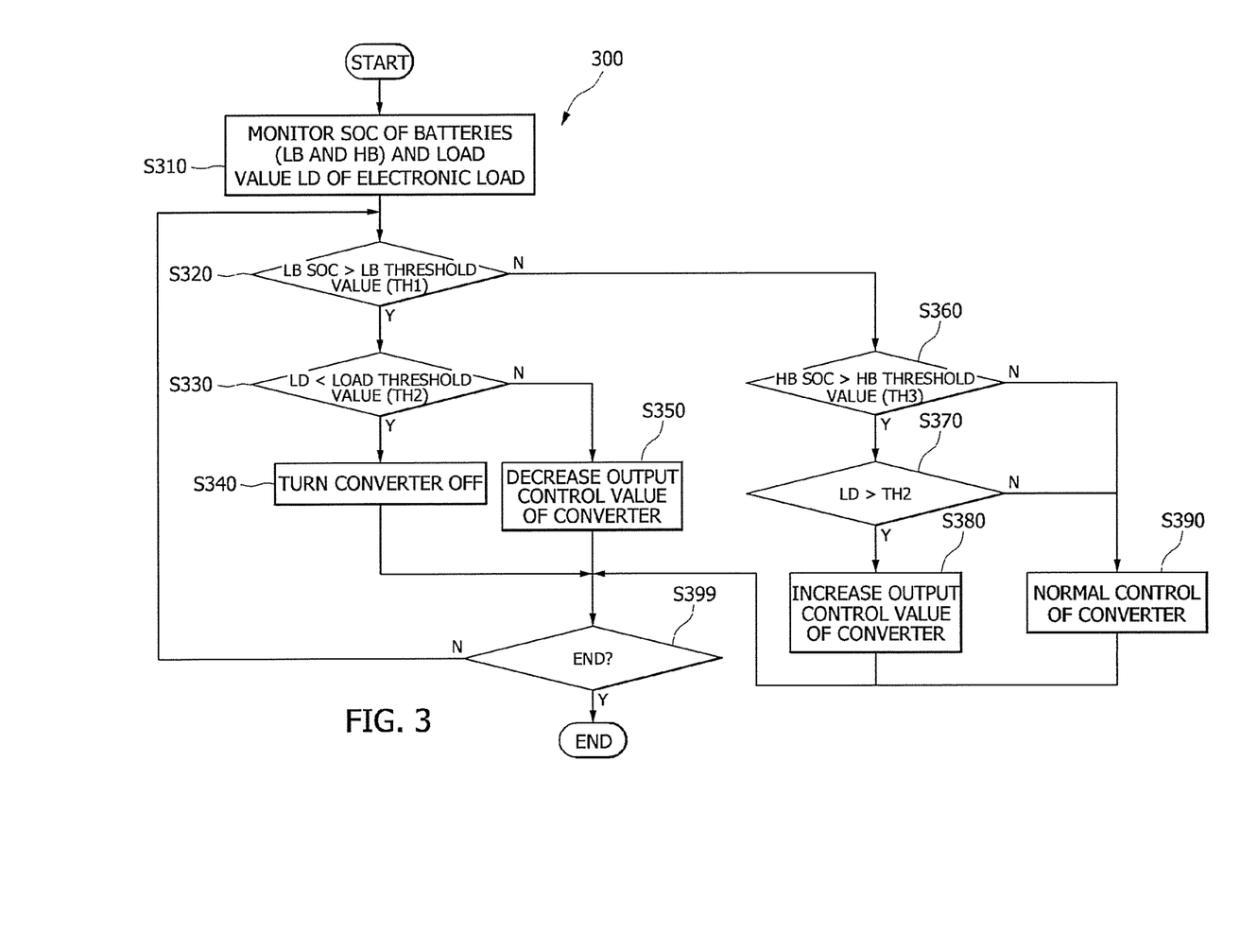
FIG. 3 is a flowchart of a converter controlling method for a hybrid vehicle, according to an embodiment of the present disclosure.
Figure 4:
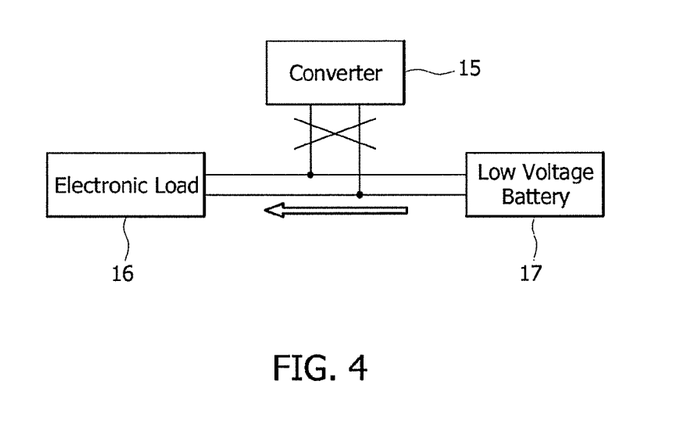
FIG. 4 is a diagram illustrating an example of turning a converter off in the converter controlling method for the hybrid vehicle, according to the embodiment of the present disclosure.
Figure 5:
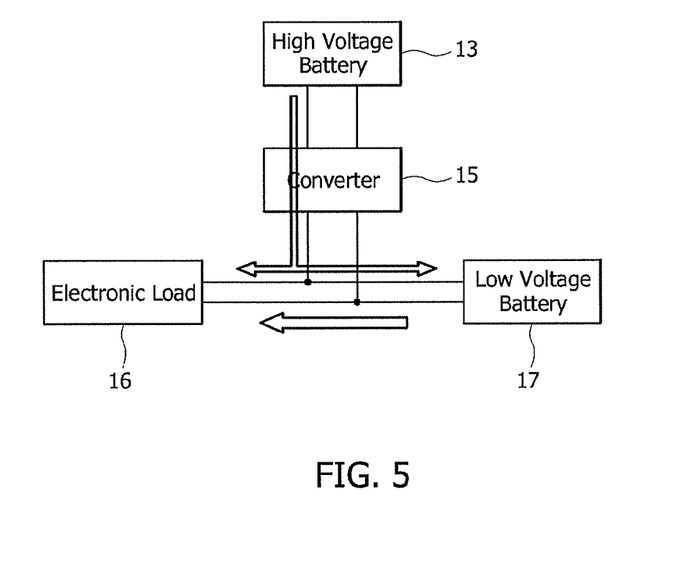
FIG. 5 is a diagram illustrating an example of decreasing an output control value of the converter in the converter controlling method for the hybrid vehicle, according to the embodiment of the present disclosure.
Figure 6:
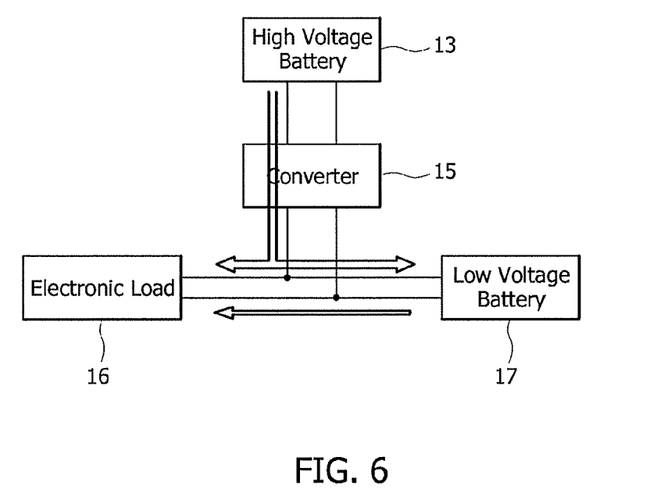
FIG. 6 is a diagram illustrating an example of increasing the output control value of the converter in the converter controlling method for the hybrid vehicle, according to the embodiment of the present disclosure.

Hereinafter, converter controlling methods for the hybrid vehicle 100 will be described with reference to FIGS. 3 to 8. FIG. 3 is a flowchart of a converter controlling method 300 for the hybrid vehicle 100, according to an embodiment of the present disclosure, FIG. 4 is a diagram illustrating an example of turning the converter 15 off in the converter controlling method 300 for the hybrid vehicle 100, according to the embodiment of the present disclosure, FIG. 5 is a diagram illustrating an example of decreasing the output control value of the converter 15 in the converter controlling method 300 for the hybrid vehicle 100, according to the embodiment of the present disclosure, and FIG. 6 is a diagram illustrating an example of increasing the output control value of the converter 15 in the converter controlling method 300 for the hybrid vehicle 100, according to the embodiment of the present disclosure.

The converter controlling method 300 for the hybrid vehicle 100 includes steps S310 to S330, S360 and S370 of monitoring and determining the SoC of the high voltage battery 13, the SoC of the low voltage battery 17, and a state of the electronic load 16, step S340 of turning the converter 15 off, step 350 of decreasing the output control value of the converter 15, and step S380 of increasing the output control value of the converter 15.

More specifically, as illustrated in FIG. 3, the SoC of the high voltage battery 13, the SoC of the high voltage battery 17, the load value LD of the electronic load 16 may be monitored through a connection to the high voltage battery 13, the high voltage battery 17, and the electronic load 16 (step S310).

Next, the level of the SoC of the low voltage battery 17 is compared with the first charging threshold value Th1 (S320). When the level of the SoC of the low voltage battery 17 is higher than the first charging threshold value Th1, that is, when the low voltage battery 17 is fully charged or the charging of the low voltage battery 17 is not required, the load value LD of the electronic load 16 may be compared with the load threshold value Th2 (step S330).

As the comparison result of step S330, when the load value LD of the electronic load 16 is lower than the load threshold value Th2, that is, when the low voltage battery 17 supplies sufficient power to the electronic load 16, in order to save power of the high voltage battery 13 through the converter 15, the converter 15 may be turned off such that the low voltage battery 17 supplies power to the electronic load 16 (step S340) alone.

As illustrated in FIG. 4, since the electronic load 16 receives power from the low voltage battery 17 alone and a power supply from the high voltage battery 13 even though the converter 15 is cut off, energy charged in the high voltage battery 13 can be saved. Accordingly, a timing of an engine generation mode can be delayed to delay a timing of fuel consumption required for the engine generation mode, thereby reducing fuel consumption.

As the determination result of step S330, when the load value LD of the electronic load 16 is higher than the load threshold value Th2, that is, when the charging of the low voltage battery 17 is not required, but due to a required power of the electronic load 16 being high, the low voltage battery 17 alone cannot supply sufficient power to the electronic load 16 for a certain period of time, the high voltage battery 13 as well as the low voltage battery 17 can be controlled so as to supply power through the converter 15. Here, in order to make full use of power of the low voltage battery 17, the output control value of the converter 15 may be decreased to be lower than a level during normal control (step S350).

At this time, during normal control of the converter 15, the converter 15 may supply a current amount required for the electronic load 16 to maintain a specific voltage, by using power of the high voltage battery 13.

As illustrated in FIG. 5, since the electronic load 16 receives most power from the low voltage battery 17 and receives only a small amount of power from the high voltage battery 13 through the converter 15, consumption of power of the high voltage battery 13 through the converter 15 can be minimized to save energy charged in the high voltage battery 13. Accordingly, a timing of an engine generation mode can be delayed to delay a timing of fuel consumption required for the engine generation mode, thereby reducing fuel consumption.

As in steps S330 and S340, when the converter 15 is turned off or the output control value of the converter 15 is decreased to be lower than a level during normal control, it is possible to increase a power supply amount from the low voltage battery 17 to the electronic load 16.

As the comparison result of step S320, when the level of the SoC of the low voltage battery 17 is lower than the first charging threshold value Th1, the level of the SoC of the high voltage battery 13 may be compared with the second charging threshold voltage Th3 (S360). When the level of the SoC of the high voltage battery 13 is higher than the second charging threshold voltage Th3, the load value LD of the electronic load 16 may be compared with the load threshold value Th2 (step S370).

As the comparison result of step S370, when the load value LD of the electronic load 16 is higher than the load threshold value Th2, that is, when the charging of the high voltage battery 13 is not required and the charging of the low voltage battery 17 is required, in particular, when the electronic load 16 requires a high current and thus, a required power of the electronic load 16 is relatively high, the low voltage battery 17 may be charged through the converter 15 using power of the high voltage battery 13, or the output control value of the converter 15 may be increased to be higher than a level during normal control (step S380).

In other words, when the charging of the low voltage battery 17 is required as the comparison result of step S320, the charging of the high voltage battery 13 is not required as the comparison result of the step S360, and the load value LD of the electronic load 16 is higher than the load threshold value Th2 as the comparison result of step S370, the output control value of the converter 15 may be increased to be higher than a level during normal control such that a power supply amount through the converter 15 is increased.

As illustrated in FIG. 6, since the electronic load 16 receives most power from the high voltage battery 13 through the converter 15 and receives only a small amount of power from the low voltage battery 17, it is possible to decrease a power supply to the electronic load 16 from the low voltage battery 17, thereby quickly charging the low voltage battery 17.

When the level of the SoC of the high voltage battery 13 is lower than the second charging threshold voltage Th3, that is, the charging of the high voltage battery 13 is required, as the comparison result of step S360, or when the load value LD of the electronic load 16 is lower than the load threshold value Th2, that is, a power supply to the electronic load 16 is required, as the comparison result of step S370, the converter may be normally controlled (step S390).

At this time, it is possible to supply a current amount required for the electronic load 16 to maintain a specific voltage, by using power of the high voltage battery 13.

As in steps S340, S350, S380, and S390, when control is completed according to the SoC of the high voltage battery 13, the SoC of the low voltage battery 17, and the load value LD of the electronic load 16, it may be determined whether driving of the hybrid vehicle 10 ends (S399). When the driving does not end, the converter controlling method 300 including steps S320 to S390 may be repeatedly performed by returning to step S320.

As the determination result of step S399, when the driving of the hybrid vehicle 10 ends, the converter controlling method 300 may end.

On the other hand, when generation is performed by the motor-generator 11 during control of the converter 15 as described above, after power is charged in the high voltage battery 13, the power may not be supplied to the electronic load 16 or the low voltage battery 17 through the converter 15 and an output of the inverter 12 may be directly supplied to the electronic load 16 or the low voltage battery 17 through the converter 15.

Figure 7:
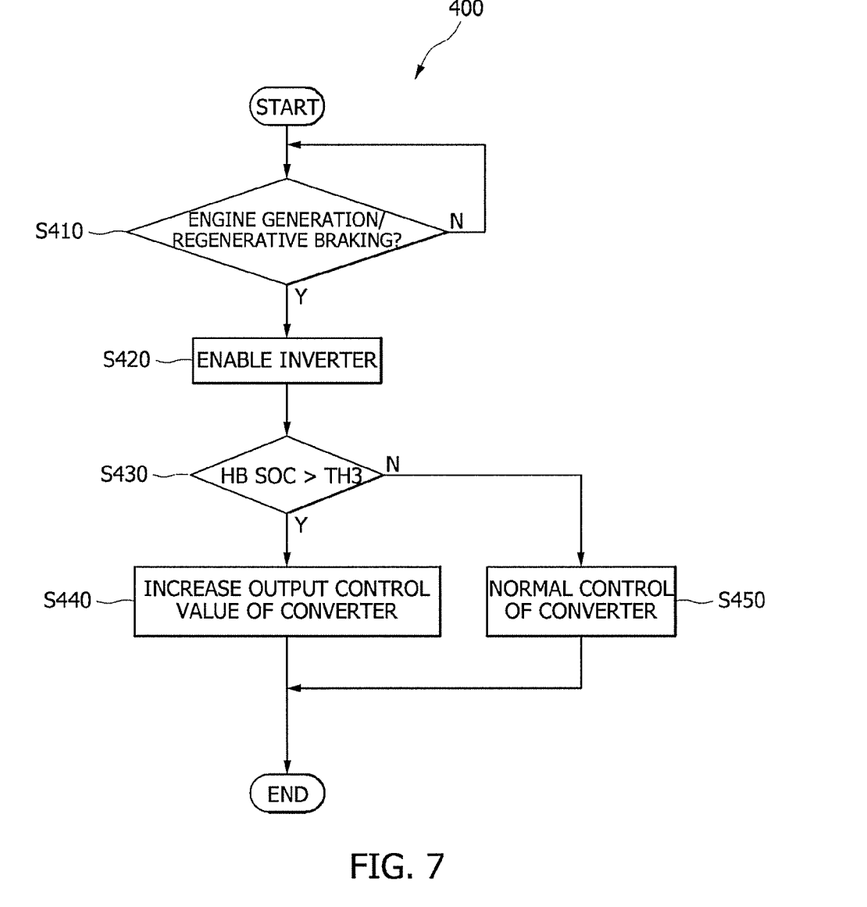
FIG. 7 is an operation flowchart of engine generation and regenerative braking in a converter controlling method for a hybrid vehicle, according to an embodiment of the present disclosure.
Figure 8:
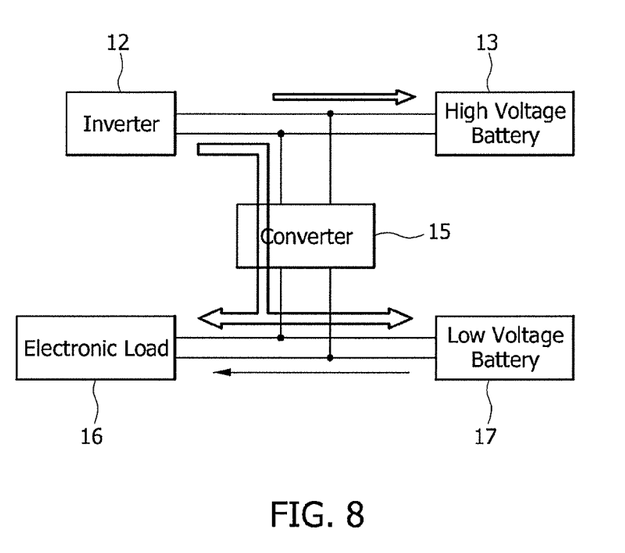
FIG. 8 is a diagram illustrating an example of increasing an output control value of a converter in FIG. 7.

FIG. 7 is an operation flowchart of engine generation and regenerative braking in a converter controlling method 400 for a hybrid vehicle 100, according to an embodiment of the present disclosure, and FIG. 8 is a diagram illustrating an example of increasing the output control value of the converter 15 in FIG. 7.

During engine generation and regenerative braking, the converter controlling method 400 includes step S410 of determining whether an engine generation mode or a regenerative braking mode is performed, step S420 of enabling the inverter 12, step S430 of determining the SoC of the high voltage battery 13, and step S440 of adjusting the output control value of the converter 15.

More specifically, as illustrated in FIG. 7, it may be determined whether the motor-generator 11 operates in the engine generation mode or the regenerative braking mode (step S410), and when the motor-generator 11 does not operate in the engine generation mode or the regenerative braking mode, monitoring may be continuously performed until the motor-generator 11 enters the engine generation mode or the regenerative braking mode.

As the determination result of step S410, when the motor-generator 11 operates in the engine generation mode or regenerative braking mode, in order to charge the high voltage battery 13, the inverter 12 can be enabled (step S420).

Afterwards, the level of the SoC of the high voltage battery 13 may be compared with the second charging threshold value Th3 (S430). When the level of the SoC of the high voltage battery 13 is higher than the second charging threshold value Th3, that is, when the charging of the high voltage battery 13 is not required, the output control value of the converter 15 may be increased to be higher than a level during normal control such that a power supply amount through the converter 15 is increased (step S440).

As illustrated in FIG. 8, since, during the engine generation mode or the regenerative generation mode, the inverter 12 supplies most power provided to the electronic load 16 or the low voltage battery 17 to charge the low voltage battery 17 through the converter 15 or supplies only a small amount of power to the high voltage battery 13 to charge the high voltage battery 13, generated power can be directly supplied to loads such as the low voltage battery 17 and the electronic load 16 from the inverter 12 through the converter 15. Accordingly, it is possible to shorten a path of a power supply to the electronic load 16 and the low voltage battery 17 through the converter 15, thereby improving energy efficiency.

As the comparison result of step S430, when the level of the SoC of the high voltage battery 13 is lower than the second charging threshold value Th3, that is, when the charging of the high voltage battery 130 is required, the converter 15 may be normally controlled (step S450).

That is, in order to constantly maintain the SoC of the high voltage battery 13 or the low voltage battery 17, while the output control value of the converter 15 is controlled to a certain level during normal control, the inverter 12 can charge the high voltage battery 13, and as needed, power can be supplied to loads such as the electronic load 16 and the low voltage battery 17 from the high voltage battery 13 through the converter 15. At this time, power may be charged in the low voltage battery 17 through the converter 15, or the charged power may be supplied to the electronic load 16.

Due to the aforementioned methods, a path of a power supply to a load through a converter can be shortened to reduce energy loss, thereby improving energy efficiency. A timing of fuel consumption for engine generation can be delayed to decrease a fuel consumption amount, thereby improving fuel economy of a vehicle.

The aforementioned methods may be implemented using the ECU 14 as illustrated in FIG. 1 and the converter controlling device 100 as illustrated in FIG. 2, in particular, software programs performing the steps described above. The software programs may be stored in a computer-readable recording medium or may be transmitted by a computer data signal combined with a carrier wave through a transmission medium or a communications network.

The computer-readable recording medium includes all types of recording devices storing data readable by a computer system. Examples of the recording device readable by the computer include a ROM, a RAM, a CD-ROM, a DVD-ROM, a DVD-RAM, a magnetic tape, a floppy disk, a hard disk, an optical data storage device, and the like.

The foregoing descriptions of specific exemplary embodiments of the present disclosure have been presented with respect to the drawings and are not intended to be exhaustive or to limit the present disclosure to the precise forms disclosed, and obviously many modifications and variations are possible for a person having ordinary skill in the art in light of the above teachings.

What is claimed is:

1. A converter controlling device for a hybrid vehicle, comprising an electronic control unit (ECU) configured to:
monitor a state of charge (SoC) of a low voltage battery, an SoC of a high voltage battery, and a load value of an electronic load;
compare a level of the SoC of the low voltage battery, a level of the SoC of the high voltage battery, and the load value of the electronic load with a first charging threshold value, a second charging threshold value, and a load threshold value, respectively;
determine whether to adjust an output control value of a converter as comparison results of the ECU; and
decrease the output control value of the converter to be lower than a level during normal control such that a power supply amount from the low voltage battery to the electronic load is increased, or increase the output control value of the converter to be higher than the level during the normal control such that a power supply amount through the converter is increased, as a determination result of the ECU.

2. The converter controlling device according to claim 1, wherein, as the comparison results, when the level of the SoC of the low voltage battery is higher than the first charging threshold value and the load value of the electronic load is lower than the load threshold value, the ECU determines to turn the converter off, and the ECU turns the converter off.

3. The converter controlling device according to claim 1, wherein, as the comparison results, when the level of the SoC of the low voltage battery is higher than the first charging threshold value and the load value of the electronic load is higher than the load threshold value, the ECU determines to decrease the output control value of the converter, and the ECU decreases the output control value of the converter to be lower than the level during the normal control.

4. The converter controlling device according to claim 1, wherein, as the comparison results, when the level of the SoC of the low voltage battery is lower than the first charging threshold value, the level of the SoC of the high voltage battery is higher than the second charging threshold value, and the load value of the electronic load is higher than the load threshold value, the ECU determines to increase the output control value of the converter, and the ECU increases the output control value of the converter to be higher than the level during normal control.

5. The converter controlling device according to claim 1, wherein the ECU determines whether a motor-generator operates in an engine generation mode or a regenerative braking mode, and when the motor-generator operates in the engine generation mode or the regenerative braking mode, and concurrently, the level of the SoC of the high voltage battery is higher than the second charging threshold value as the comparison results, the ECU determines to enable the inverter and increase the output control value of the converter, and the ECU increases the output control value of the converter to be higher than the level during the normal control.

6. A converter controlling method for a hybrid vehicle, the converter controlling method comprising steps of:
- monitoring a state of charge (SoC) of a low voltage battery, an SoC of a high voltage battery, a load value of an electronic load;
- comparing a level of the SoC of the low voltage battery, a level of the SoC of the high voltage battery, and the load value of the electronic load with a first charging threshold value, a second charging threshold value, and a load threshold value, respectively;
- determining whether to adjust an output control value of a converter as comparison results; and
- adjusting the output control value as a determination result by decreasing the output control value of the converter to be lower than a level during normal control such that a power supply amount from the low voltage battery to the electronic load is increased or increasing the output control value of the converter to be higher than the level during the normal control such that a power supply amount through the converter is increased.

7. The converter controlling method according to claim 6, wherein, when, in the step of comparing, the level of the SoC of the low voltage battery is higher than the first charging threshold value and the load value of the electronic load is lower than the load threshold value, it is determined to turn the converter off in the determination, and the converter is turned off in the step of adjusting.

8. The converter controlling method according to claim 6, wherein, when, in the step of comparing, the level of the SoC of the low voltage battery is higher than the first charging threshold value and the load value of the electronic load is higher than the load threshold value, it is determined to decrease the output control value of the converter in the determination, and in the step of adjusting, the output control value of the converter is decreased to be lower than the level during the normal control.

9. The converter controlling method according to claim 6, wherein, when, in the step of comparing, the level of the SoC of the low voltage battery is lower than the first charging threshold value, the level of the charge of state of the high voltage battery is higher than the second charging threshold value, and the load value of the electronic load is higher than the load threshold value, it is determined to increase the output control value of the converter in the determination, and in the step of adjusting, the output control value of the converter is increased to be higher than the level during the normal control.

10. The converter controlling method according to claim 6, further comprising:
- determining whether a motor-generator operates in an engine generation mode or a regenerative braking mode; and
- when the motor-generator operates the engine generation mode or the regenerative braking mode, and concurrently, in the step of comparing, the level of the charge of state of the high voltage battery is higher than the second charging threshold value, enabling an inverter,
wherein, in the step of adjusting, the output control value of the converter is increased to be higher than the level during the normal control.

* * * * *